Oct. 11, 1932.  C. G. MUNTERS  1,882,026
FLUID HEAT TRANSFER SYSTEM
Filed Feb. 4, 1932
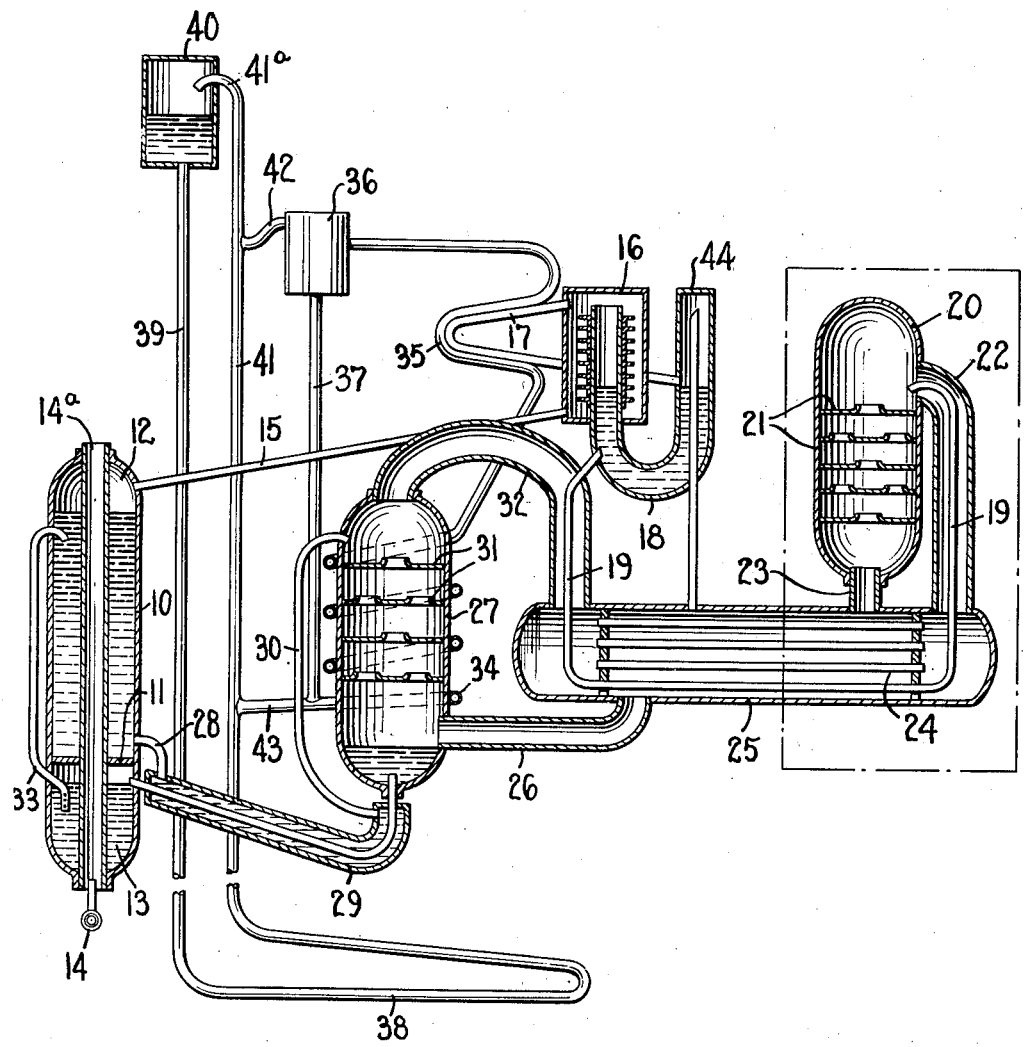
INVENTOR.
Carl Georg Munters.
BY
ATTORNEY Patented Oct. 11, 1932

1,882,026

UNITED STATES PATENT OFFICE

CARL GEORG MUNTERS, OF STOCKHOLM, SWEDEN, ASSIGNOR, BY MESNE ASSIGNMENTS, TO ELECTROLUX SERVEL CORPORATION, OF NEW YORK, N. Y., A CORPORATION OF DELAWARE

FLUID HEAT TRANSFER SYSTEM

Application filed February 4, 1932, Serial No. 590,946, and in Germany June 20, 1931.

This invention relates to heat transfer systems in which heat conducting fluid is circulated in a closed circuit by addition of heat at one point in the system and the removal of heat at another point, and more particularly such a system which operates without the use of mechanical pumps, valves, or other moving parts and which may be employed to remove heat from an object or area to be cooled at a level lower than the object or area.

A heat transfer system in accordance with this invention is particularly adaptable for cooling a refrigerating system by an ultimate cooling medium such as the earth or a body of water which is located at a point below the refrigerating system and which cannot conveniently be brought into direct heat exchange relation therewith.

Other objects and advantages will be apparent from the following description taken in connection with the accompanying drawing in which, The figure shows schematically, with parts in vertical section, a fluid heat transfer system contemplated by this invention applied to cooling the heat emitting parts of an absorption refrigerating apparatus.

Referring to the drawing, there is shown a well known refrigerating apparatus of the absorption type including a generator 10 divided by a partition 11 into a main generating chamber 12 and an auxiliary generating chamber 13 which are heated by any suitable means such as a gas burner 14 in a flue 14a. The generator contains a solution of refrigerant gas in an absorption liquid such as ammonia in water. In the main generating chamber 12 ammonia gas is expelled from solution by the application of heat and passes through conduit 15 to the rectifier 16 where absorption liquid vapor condenses and flows back to the generator through conduit 15.

Ammonia gas from rectifier 16 is liquefied by the removal of heat in condenser 17, the liquid ammonia flowing into the U-tube 18 which is closed at one end 44 and has its other end extending within and open near the top of rectifier 16. Liquid ammonia from U-tube 18 flows through conduit 19 into the upper part of evaporator 20 where it flows downwardly over baffle plates 21 evaporating and diffusing into an inert pressure equalizing gas such as hydrogen which also enters the upper part of evaporator 20 through conduit 22. The resulting gas mixture flows downwardly through conduit 23 into chamber 24 of heat exchanger 25 and then through conduit 26 into the lower part of absorber 27.

Weak absorption liquid from the main generating chamber 12 flows through conduit 28, liquid heat exchanger 29, and conduit 30 into the upper part of the absorber 27 where it flows downwardly over baffle plates 31 absorbing ammonia from the gas mixture in the absorber. The enriched absorption liquid collects in the bottom of the absorber and the hydrogen from which ammonia has been removed passes upwardly through conduit 32, heat exchanger 25, and conduit 22 back to the evaporator.

Enriched absorption liquid from the bottom of the absorber passes through the liquid heat exchanger 29 to the auxiliary generating chamber 13 from where it is raised by thermo-siphonic action through conduit 33 back to the main generating chamber 12. For a more detailed description of the operation of this type of refrigerating apparatus reference may be had to Patent No. 1,609,334, von Platen et al.

In order to remove the heat of condensation in condenser 17 and the heat of absorption in the absorber 27 there is provided a fluid heat transfer system contemplated by this invention which comprises a cooling coil 34 around the absorber and a cooling coil 35 around the condenser, these coils being connected in series. The upper end of coil 35 is connected to a separating vessel 36, the lower part of which is connected through conduit 37 to the lower end of the cooling coil 34 around the absorber thus forming a first fluid circuit.

A second fluid circuit includes a cooling coil or equivalent element 38 which may be located in the earth or in a body of subsoil water. One end of the cooling coil 38 is connected through a downcomer conduit 39 to the bottom of a reservoir 40 located above the first fluid circuit and the other end of the cooling coil 38 is connected to a riser conduit 41 which terminates in a gooseneck 41a opening into the upper part of reservoir 40.

These two circuits intercommunicate through a conduit 42 slightly inclined downwardly from the upper part of the separating chamber 36 to the riser 41 and conduit 43 from the lower end of the absorber cooling coil 34 to the riser 41. The system comprising the two intercommunicating circuits is filled with a suitable heat conducting liquid above the level of the first circuit. Heat from the absorber 27 and the condenser 17 causes the liquid in coils 34 and 35 to boil forming gas bubbles which tend to rise and carry with them slugs of liquid. This causes liquid circulation upwardly in coils 34 and 35 and downwardly in conduit 37, the vapor collecting in the upper part of separator 36.

The gas separated from the liquid in separator 36 passes through conduit 42 into the riser 41 making the liquid column in the riser lighter than the liquid column in conduit 39, thereby causing a circulation of liquid downwardly in conduit 39, through the cooling coil 38 where heat is removed, and upwardly through the riser 41 into the reservoir 40. The liquid in this circuit is comparatively cold so that the vapor entering riser 41 through conduit 42 is gradually condensed as it rises through this pipe by contact with the cold liquid. The liquid lost by vaporization in the cooling coils 34 and 35 of the first circuit is replaced by cool liquid from the riser 41 through conduit 43.

The cooling system is preferably filled with a liquid which at atmospheric pressure has a boiling point about at the usual room temperature—that is, around 20° C. Ethyl chloride is suitable since it has the advantage of not attacking iron pipes and boils at 12° C. at atmospheric pressure so that it is not necessary to evacuate the system before charging with liquid as most of the air is displaced when filling and the generated vapor forces the remaining air out of the system. It is understood, however, that this invention is not limited to the use of ethyl chloride but any suitable liquid may be used as well known in the art.

Although this invention has been described in connection with absorption type refrigerating apparatus it is apparent that it is not thus limited in use but may be employed in the cooling of any heat emitting part or parts.

It will be obvious to those skilled in the art that various other changes may be made in the construction and arrangement without departing from the spirit of the invention and therefore the invention is not limited to what is described in the specification and shown in the drawing but only as indicated in the appended claims.

I claim:

1. The method of cooling a refrigerating system by a cooling medium situated below the heat emitting portion of the system, which comprises applying heat from the heat emitting portion to vaporize a portion of heat conducting liquid, utilizing the vapor to lift the remaining liquid to a higher level, separating the vapor and the lifted liquid at this level, returning the liquid by gravity again into heat exchange relation with the heat emitting portion, utilizing the vapor to lift another portion of liquid to a still higher level and simultaneously condensing the lifting vapor, conducting liquid from the last level by gravity in heat exchange relation with the cooling medium, and then utilizing a portion of the cooled liquid to replace that which was vaporized.

2. The method of cooling a refrigerating system by a cooling medium located below the heat emitting portion of the system, which comprises applying heat from the heat emitting portion to circulate a heat conducting liquid by thermosiphonic action, utilizing the vapor resulting from the thermosiphonic action to lift another portion of heat conducting liquid to a higher level and simultaneously condensing the lifting vapor, conducting liquid from the higher level by gravity in heat exchange relation with the cooling medium, and utilizing a portion of the cooled liquid to replace that vaporized in the thermosiphonic action.

3. The method of cooling a refrigerating system by a cooling medium located below the heat emitting portion of the system, which comprises applying heat from the heat emitting portion to circulate a heat conducting liquid by thermosiphonic action, utilizing the vapor resulting from the thermosiphonic action to lift another portion of heat conducting liquid to a higher level and condensing the lifted vapor, conducting liquid from the higher level by gravity in heat exchange relation with the cooling medium, and utilizing a portion of the cooled liquid to replace that vaporized in the thermosiphonic action and another portion of the cooled liquid to remove heat from and thus condense the lifting vapor.

4. The method of cooling which comprises transferring heat into a heat conducting liquid whereby a portion of the liquid is vaporized, utilizing the vapor to lift the remaining liquid to a higher level, separating the liquid and the vapor at this higher level, returning the liquid to the heat transfer region, utilizing the separated vapor to lift another portion of liquid to a still higher lever the vapor being condensed during this step, conducting liquid from the last said level by gravity in heat exchange relation with a cooling medium below the said heat transfer region, supplying a portion of the cooled liquid to replace that which was vaporized and supplying the remainder of the cooled liquid to be again raised by and cause condensation of the separated vapor.

5. Refrigerating apparatus comprising a generator, a condenser, an evaporator, an absorber, an interconnecting conduits, a thermosiphon conduit in heat exchange relation with said absorber and said condenser, a gas and liquid separating vessel at the upper end of said vessel to the lower end of said thermosiphon conduit, a reservoir above said vessel, a cooling element in heat exchange relation with a cooling medium below the lower end of said thermosiphon conduit, a conduit from the lower part of said reservoir to said cooling element, a riser conduit from said cooling element to the upper part of said reservoir and connections from the vapor space of said separating vessel to said riser conduit and from the lower end of said thermosiphon conduit to said riser conduit.

6. Means for cooling the absorber and condenser of absorption refrigerating apparatus comprising a first fluid circuit including a thermosiphon conduit in heat exchange relation with the absorber and condenser and a gas and liquid separating chamber at the upper end of said thermosiphon conduit connected to return liquid to the lower end of said conduit, a second fluid circuit including a cooling element below said first circuit, a reservoir above said first circuit, a downcomer from said reservoir to said cooling element and a riser from said cooling element to said reservoir, said circuits being interconnected to form a single fluid system by a conduit from the gas space in said gas and liquid separator to said riser, and a conduit from the lower end of said thermosiphon conduit to said riser, said system being filled with a heat conducting fluid.

7. Refrigerating apparatus comprising a system having a heat emitting portion, a first fluid circuit having a heated portion in heat exchange relation with said heat emitting portion and a vapor accumulating chamber in the upper part of said circuit, a second fluid circuit extending above and below said first circuit and having its lower portion in heat exchange relation with a cooling medium, said circuits being interconnected by conduits from said vapor cooling chamber and the lower part of said first circuit to the same rising portion of said first circuit forming a system adapted to contain a heat conducting fluid.

8. A fluid heat transfer system comprising a first circuit having a thermosiphon conduit and a gas and liquid separator at the upper end of said conduit connected to return liquid to the lower end of said conduit, a second circuit comprising a reservoir above said first circuit, a cooling element below said first circuit, a downcomer from said reservoir to said cooling element and a riser from said cooling element to said reservoir and conduits interconnecting said circuits from the gas space in said separator to said riser and from the lower end of said thermosiphon conduit to said riser to form a system adapted to be filled with heat conducting fluid.

9. A fluid heat transfer system comprising a first circuit having a heated portion formed to circulate liquid by thermosiphonic action and a vapor collecting chamber in the upper part of the circuit, a second fluid circuit extending above and below said first circuit having its lower portion adapted to be cooled and conduits interconnecting said circuits from said vapor collecting chamber and the lower part of the first circuit to the same rising portion of the second circuit forming a system adapted to be filled with a heat conducting fluid.

10. In a fluid heat transfer system, a heated portion through which heat conducting liquid is circulated by thermosiphonic action, a cooled portion below said heated portion, means for utilizing vapor formed in said heated portion to circulate liquid through said cooled portion by gravity, means for returning unvaporized liquid directly to said heated portion, and means for supplying liquid from said cooled portion to replace liquid vaporized in said heated portion.

11. In a fluid heat transfer system, a heated portion through which heat conducting liquid is circulated by thermosiphonic action, means for returning unvaporized liquid directly to said heated portion, a cooled portion below said heated portion, means for utilizing vapor formed in said heated portion to circulate liquid through said cooled portion and simultaneously condense the vapor, and means for supplying liquid from said cooled portion to replace liquid vaporized in said heated portion.

12. In a fluid heat transfer system, a heated portion, a cooled portion below said heated portion, means utilizing vapor formed in said heated portion to circulate liquid through said cooled portion by gravity, means for returning unvaporized liquid directly to said heated portion, means for supplying liquid from said cooled portion to replace liquid vaporized in said heated portion, and means whereby liquid from said cooled portion condenses vapor from said heated portion.

13. A fluid heat transfer system comprising, a first circuit including a thermosiphon element for circulation of liquid therein, and a second circuit including a cooling element, said circuits being interconnected such that vapor from said first circuit is introduced into said second circuit to create circulation of liquid therein and liquid from said second circuit is conducted to said first circuit to replace liquid vaporized therein.

14. A cooling system for the absorber of a refrigerating apparatus comprising, a first circuit including a thermosiphon element in heat exchange relation with said absorber, and a second circuit including a cooling element, said circuits being interconnected such that vapor from said first circuit is introduced into said second circuit to create circulation of liquid therein and liquid from said second circuit is conducted to said first circuit to replace liquid vaporized therein.

15. A cooling system for the absorber and condenser of a refrigerating apparatus comprising, a first circuit including thermosiphon elements in heat exchange relation with said absorber and condenser arranged to circulate liquid in the same direction, and a second circuit including a cooling element, said circuits being interconnected such that vapor from said first circuit is introduced into said second circuit to create circulation of liquid therein and liquid from said second circuit is conducted to said first circuit to replace liquid vaporized therein.

In testimony whereof, I affix my signature.

CARL GEORG MUNTERS.